(12) United States Patent
Fan et al.

(10) Patent No.: US 11,192,527 B2
(45) Date of Patent: Dec. 7, 2021

(54) CAMERA FOR A VEHICLE INCLUDING A WIPING MEMBER

(71) Applicant: BAIDU ONLINE NETWORK TECHNOLOGY (BEIJING) CO., LTD., Beijing (CN)

(72) Inventors: Zongtao Fan, Beijing (CN); Bolei Wang, Beijing (CN); Jingsheng Hu, Beijing (CN); Cheng Tan, Beijing (CN); Rui Ren, Beijing (CN); Guangzhong Liu, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 16/516,428

(22) Filed: Jul. 19, 2019

(65) Prior Publication Data

US 2020/0070778 A1    Mar. 5, 2020

(30) Foreign Application Priority Data

Sep. 3, 2018  (CN) .......................... 201811021077.1
Sep. 3, 2018  (CN) ......................... 201821438995.X (51) Int. Cl.
  B60S 1/08 (2006.01)
  B60S 1/04 (2006.01)
  G02B 27/00 (2006.01)

(52) U.S. Cl.
  CPC ........... B60S 1/0848 (2013.01); B60S 1/0405 (2013.01); G02B 27/0006 (2013.01)

(58) Field of Classification Search
  CPC .... B60S 1/0848; B60S 1/0405; B60S 1/0818; B60S 1/0411; B60S 1/566; G02B 27/0006
  See application file for complete search history.

(56) References Cited

U.S. PATENT DOCUMENTS 9,380,190 B2    6/2016  Pawlowski
10,549,726 B2   2/2020  Garcia Crespo et al.
(Continued)

FOREIGN PATENT DOCUMENTS

DE    102014004172 A1    9/2014
DE    202018103489 U1    3/2018
(Continued)

OTHER PUBLICATIONS

Extended European Search Report for Application No. 19185777.0, dated Jan. 20, 2020, 7 pages.
(Continued)

*Primary Examiner* — Padma Haliyur
(74) *Attorney, Agent, or Firm* — Fay Sharpe LLP (57) ABSTRACT

An imaging device for a vehicle and a vehicle are disclosed. The imaging device includes: a casing, a camera, a wiping member, and a drive device. The casing includes a casing body and a transparent cover disposed to the casing body, and the transparent cover is rotatable relative to the casing body. The camera is disposed in the casing and configured to obtain image information outside the transparent cover through the transparent cover. The wiping member is disposed to the casing and is stationary relative to the camera. The drive device is connected with the transparent cover and configured to drive the transparent cover to rotate to enable the wiping member to wipe an outer surface of the transparent cover.

19 Claims, 5 Drawing Sheets

(56) References Cited

U.S. PATENT DOCUMENTS

| | | | |
|---|---|---|---|
| 2012/0000024 A1* | 1/2012 | Layton | H04N 5/225 |
| | | | 15/97.1 |
| 2014/0299748 A1* | 10/2014 | Koops | G01J 1/0252 |
| | | | 250/216 |
| 2017/0244873 A1 | 8/2017 | Izabel et al. | |
| 2018/0201230 A1* | 7/2018 | Schafer | B60R 1/00 |
| 2018/0244245 A1 | 8/2018 | Schmidt et al. | |
| 2018/0265005 A1* | 9/2018 | Lettis | B60R 1/074 |
| 2019/0016310 A1* | 1/2019 | Matesic | B60R 1/00 |
| 2019/0086773 A1* | 3/2019 | Okamura | G02B 27/0006 |

FOREIGN PATENT DOCUMENTS

| | | |
|---|---|---|
| JP | H07309211 A | 11/1995 |
| JP | 2000056367 A | 2/2000 |
| JP | 2015182656 A | 10/2015 |
| JP | 2017532248 A | 11/2017 |
| WO | 2017191033 A1 | 11/2017 |

OTHER PUBLICATIONS

Office Action for Japanese Application No. 2019-131069, dated Jul. 14, 2020, 14 pages.

* cited by examiner

CAMERA FOR A VEHICLE INCLUDING A WIPING MEMBER

CROSS-REFERENCE TO RELATED APPLICATION

This application claims priority to and benefits of Chinese Patent Application Serial No. 201811021077.1, filed with National Intellectual Property Administration of PRC on Sep. 3, 2018, and Chinese Patent Application Serial No. 201821438995.X, filed with National Intellectual Property Administration of PRC on Sep. 3, 2018, the entire content of which are incorporated herein by reference.

FIELD

The present disclosure relates to a technical field of vehicles, and more particularly to an imaging device for a vehicle, and a vehicle.

BACKGROUND

In the related art, when a self-driving vehicle is driving on a rainy day, rainwater will affect imaging of a camera lens that collects information, thereby resulting in difference between image information collected by the camera lens and information on actual road condition and vehicle condition, which may cause an automatic driving system of the self-driving vehicle to make a wrong decision, and endangering the safety of passengers and vehicles. Likewise, dust and stains on the lens may also affect the imaging. Thus, there is room for improvement.

SUMMARY

The present disclosure aims to solve one of the technical problems in the related art at least to some extent. To this end, the present disclosure proposes an imaging device for a vehicle, which enables a camera to stay immobile relative to a wiping member and enables a transparent cover itself to rotate, such that the wiping member cleans the transparent cover and normal image information acquisition of the camera will not be affected.

The present disclosure further proposes a vehicle having the above imaging device.

The imaging device according to embodiments of the present disclosure includes a casing including a casing body and a transparent cover provided to the casing body, the transparent cover being rotatable relative to the casing body; a camera provided in the casing and configured to obtain image information outside the transparent cover through the transparent cover; a wiping member provided to the casing and being stationary relative to the camera; and a drive device connected with the transparent cover and configured to drive the transparent cover to rotate so as to enable the wiping member to wipe an outer surface of the transparent cover.

For the imaging device according to embodiments of the present disclosure, the imaging device keeps the camera immobile relative to the wiping member, and rotates the transparent cover by itself, so as to enable the wiping member to clean the transparent cover without affecting the normal image acquisition of the camera.

Additionally, the imaging device for the vehicle according to embodiments of the present disclosure may also have the following technical features.

According to some embodiments of the present disclosure, the casing body includes an upper casing and a lower casing that are spaced apart from each other in an up-and-down direction, and the transparent cover is disposed between the upper casing and the lower casing.

According to some embodiments of the present disclosure, the transparent cover has an upper end rotatably fitted with an inner peripheral surface of the upper casing and a lower end rotatably fitted with an inner peripheral surface of the lower casing, and an outer peripheral surface of the upper casing and an outer peripheral surface of the lower casing protrude beyond an outer peripheral surface of the transparent cover.

According to some embodiments of the present disclosure, the wiping member connects the upper casing and the lower casing.

According to some embodiments of the present disclosure, the outer peripheral surface of the upper casing is provided with an upper casing groove running through a peripheral wall of the upper casing upwards and downwards, and the outer peripheral surface of the lower casing is provided with a lower casing groove running through a peripheral wall of the lower casing upwards; the upper casing groove is corresponding to the lower casing groove in the up-and-down direction; and the wiping member has an upper end connected in the upper casing groove and a lower end connected in the lower casing groove.

According to some embodiments of the present disclosure, the wiping member includes a connecting rod portion and a wiping portion; the connecting rod portion is configured to be connected with the upper casing groove and the lower casing groove; and the wiping portion is disposed to an inner surface of the connecting rod portion and configured to wipe the transparent cover.

According to some embodiments of the present disclosure, the drive device includes a drive motor.

According to some embodiments of the present disclosure, a rotational speed of the transparent cover driven by the drive device is in proportion to the amount of rain/snow.

According to some embodiments of the present disclosure, the drive device drives the transparent cover to rotate in a single direction.

According to some embodiments of the present disclosure, the drive device drives the transparent cover to rotate alternately in a forward direction and a reverse direction.

According to some embodiments of the present disclosure, the transparent cover has an annular peripheral wall, and the drive device is configured to drive the transparent cover to rotate around a central axis of the annular peripheral wall.

According to some embodiments of the present disclosure, the transparent cover has a circular top wall closing the annular peripheral wall and a circular bottom wall closing the annular peripheral wall.

According to some embodiments of the present disclosure, a drive shaft of the drive device is linked with the circular top wall and the circular peripheral wall.

According to some embodiments of the present disclosure, the transparent cover and the casing body are provided with a rolling bearing therebetween.

According to some embodiments of the present disclosure, the transparent cover and the casing body are further provided with a sealing ring therebetween.

According to some embodiments of the present disclosure, an inner peripheral surface of the transparent cover is provided with a round of gear teeth, the drive device is configured as a drive motor whose motor shaft has a motor shaft gear, and the motor shaft gear is meshed with the gear teeth directly or through a speed change mechanism for transmission.

According to some embodiments of the present disclosure, a plurality of wiping members are provided and distributed along a circumferential direction, a plurality of cameras are provided and distributed along the circumferential direction, and the plurality of wiping members and the plurality of cameras are staggered in the circumferential direction.

A vehicle according to another aspect of the present disclosure includes an imaging device according to above embodiments; and a roof, the imaging device being disposed on the roof of the vehicle.

REFERENCE NUMERALS imaging device 100, casing 1, casing body 11, transparent cover 12, camera 2, wiping member 3, drive device 4, upper casing 111, lower casing 112, upper casing groove 1111, lower casing groove 1121, connecting rod portion 31, wiping portion 32.

DETAILED DESCRIPTION

Embodiments of the present disclosure will be described in detail hereinafter and examples of the embodiments will be illustrated in the drawings. The same or similar elements and the elements having same or similar functions are denoted by like reference numerals throughout the descriptions. The embodiments described below with reference to the drawings are illustrative and used to generally understand the present disclosure, and shall not be construed to limit the present disclosure.

In the specification, it is to be understood that terms such as "central," "longitudinal," "transverse," "length," "width," "thickness," "upper," "lower," "front," "rear," "left," "right," "vertical," "horizontal," "top," "bottom," "inner," "outer," "clockwise," and "counterclockwise" should be construed to refer to the orientation or position relationship as then described or as shown in the drawings under discussion. These relative terms are for convenience and simplification of description and do not indicate or imply that the present disclosure have a particular orientation, or be constructed and operated in a particular orientation. Thus, these terms shall not be construed to limit the present disclosure.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, the term "a plurality of" means two, three or etc., unless specified otherwise.

In the description of the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements or mutual interaction of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

An imaging device 100 for a vehicle according to embodiments of the present disclosure will be described below with reference to FIGS. 1-5.

The imaging device 100 according to embodiments of the present disclosure may include: a casing 1, a camera 2, a wiping member 3, and a drive device 4. The imaging device 100 may be disposed on an intelligent self-driving vehicle, and certainly can also be disposed on an ordinary human-driving vehicle. For the sake of clarity, an example of applying the imaging device 100 to the intelligent self-driving vehicle will be illustrated below, but such illustrative description shall not be construed to limit the protection scope of the present disclosure. It should be clearly understood by those skilled in the art that application of the imaging device 100 to the human-driving vehicle falls within the protection scope of the present disclosure as well.

Figure 1:
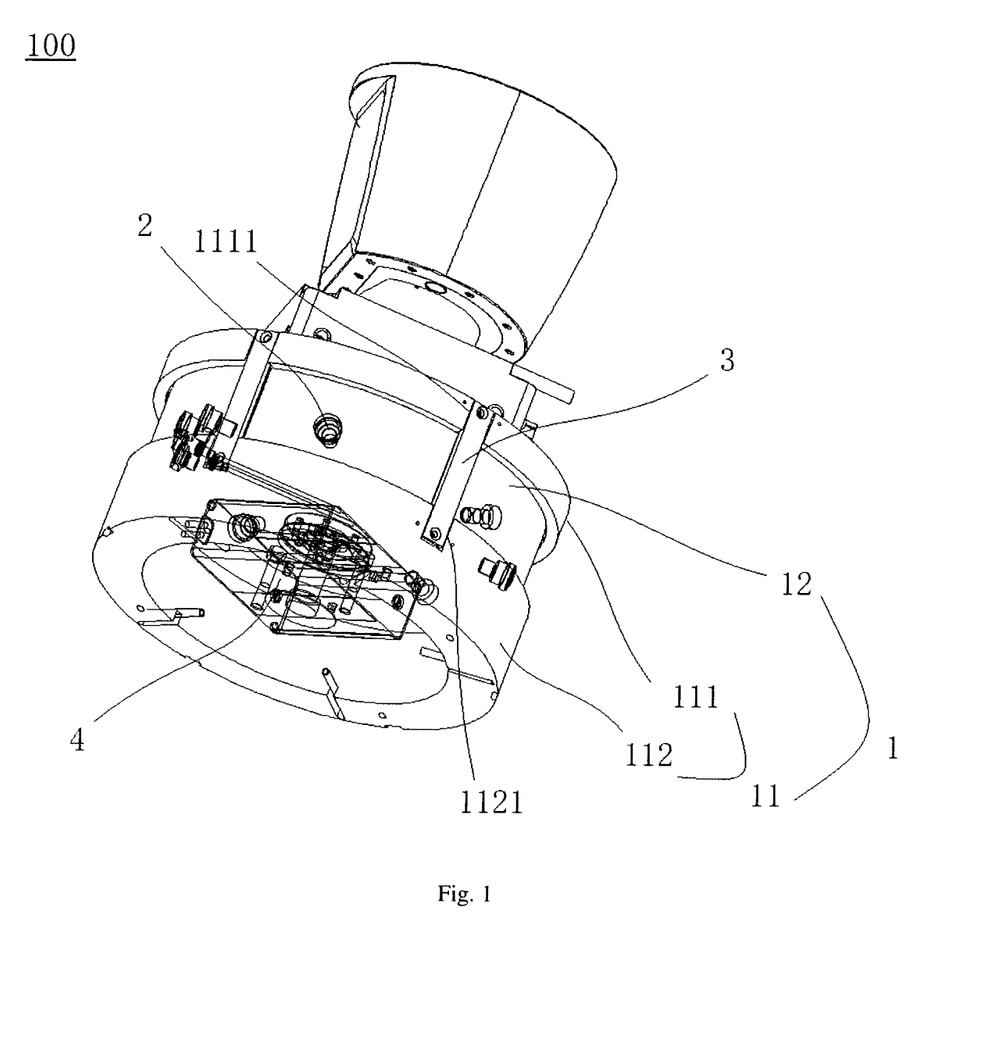
FIG. 1 is a perspective view of an imaging device according to an embodiment of the present disclosure.
Figure 2:
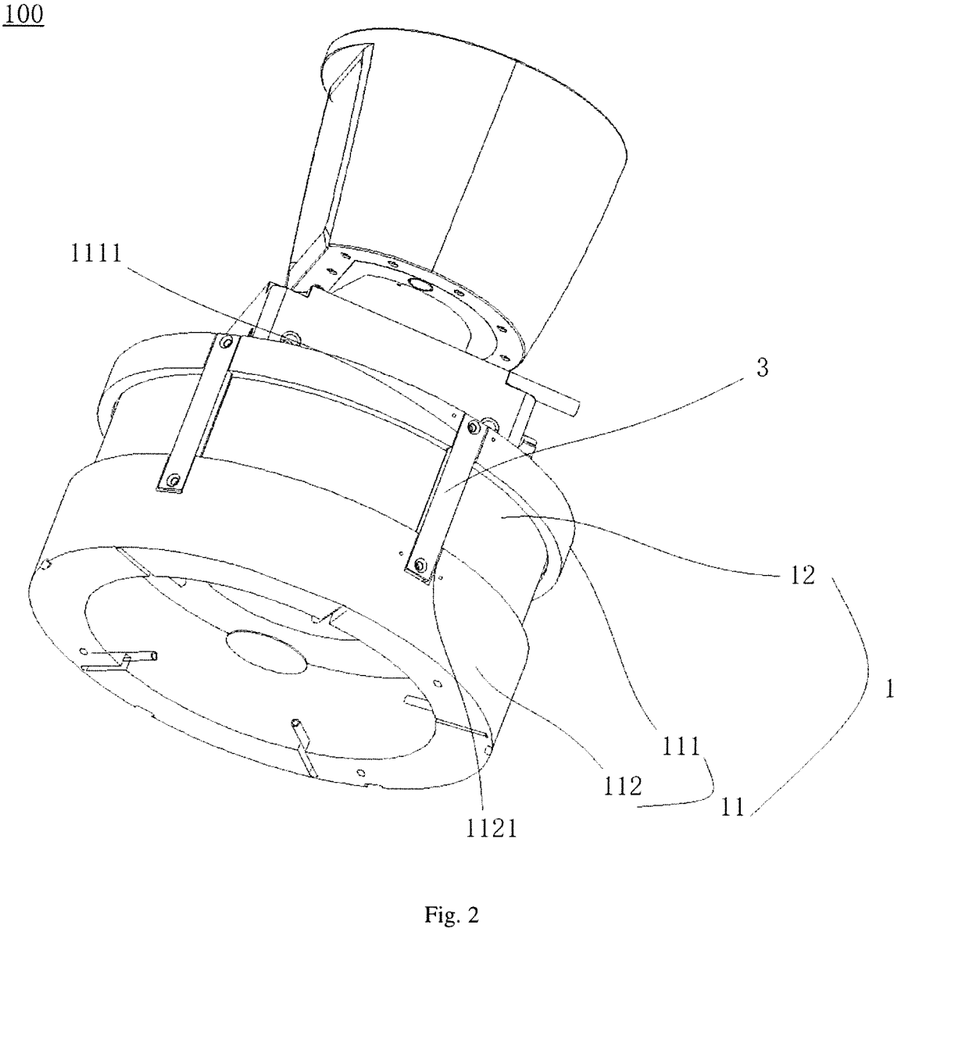
FIG. 2 is a schematic view of an imaging device according to an embodiment of the present disclosure.

As shown in FIGS. 1 and 2, the imaging device 100 may be disposed on a roof of the vehicle. The casing 1 includes a casing body 11 and a transparent cover 12 disposed to the casing body 11, and the transparent cover 12 is rotatable relative to the casing body 11. In other words, the casing body 11 is fixed on the roof of the vehicle and stays immobile, but the transparent cover 12 can rotate by itself relative to the casing body 11.

In some embodiments of the present disclosure, referring to FIG. 1, the camera 2 is disposed in the casing 1 and used to obtain image information outside the transparent cover 12 through the transparent cover 12. The arrangement of the camera 2 in the casing 1 can protect the camera 2 from external damages effectively. Since the transparent cover 12 has good transparency, the accuracy and authenticity of the image information collected by the camera 2 are ensured.

Figure 3:
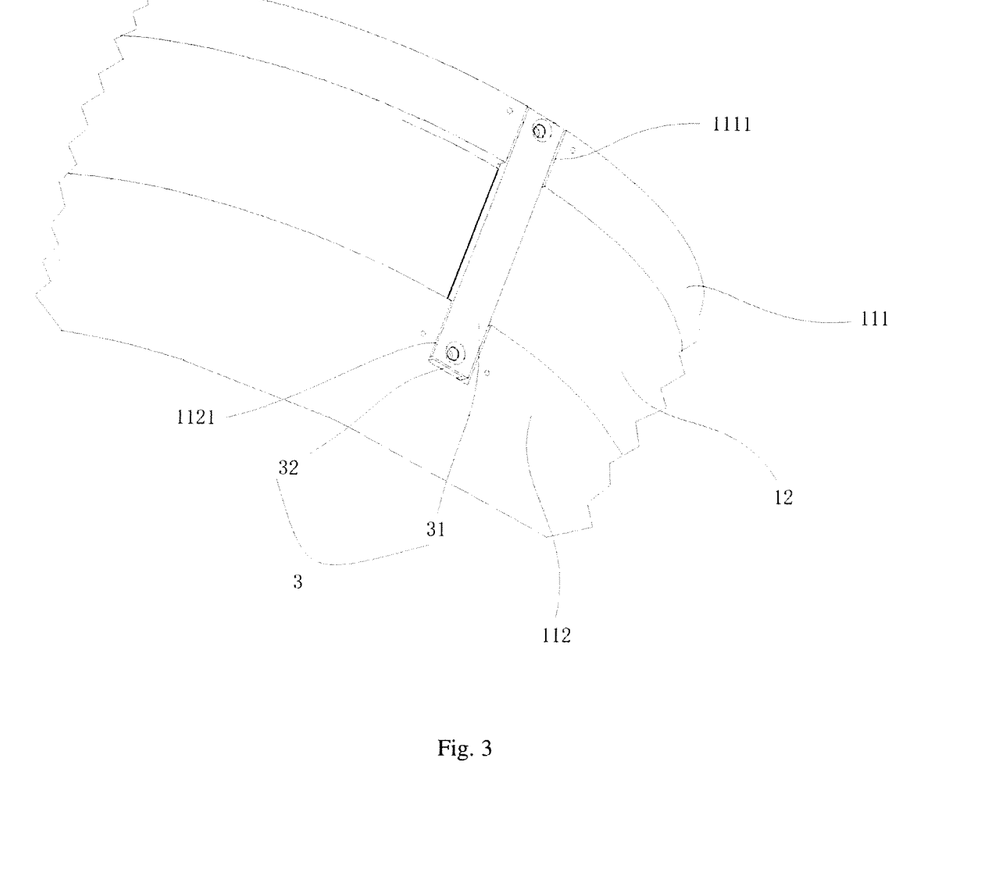
FIG. 3 is a partially schematic view of an imaging device according to an embodiment of the present disclosure.

In an embodiment shown in FIGS. 1-3, the wiping member 3 is configured as a cleaning component disposed to the casing 1, and can wipe an outer surface of the transparent cover 12 under the drive of the drive device 4 to ensure the cleanness of the outer surface of the transparent cover 12. Since the outer surface of the transparent cover 12 is contaminated with rainwater or dust, image information acquisition of the camera 2 is affected, and image information data transmitted by the camera 2 to an automatic driving system of the vehicle is inaccurate, causing the automatic driving system of the vehicle to make a wrong decision, resulting in vehicle driving errors, and endangering the safety of vehicles and passengers. Therefore, it is required to provide the wiping member 3 to clean the transparent cover 12, so as to ensure that the transparent cover 12 is clean and tidy all the time, thereby guaranteeing the authenticity and accuracy of the imaging by the camera 2.

In order to prevent the wiping member 3 from affecting the image acquisition of the camera 2, the wiping member 3 according to the present disclosure is immobile relative to the camera 2. That is, the camera 2 is disposed in a fixed position in the casing 1 and stays still, and the wiping member 3 is disposed to the casing body 11 and stays still, such that the camera 2 and the wiping member 3 form a static state relative to each other. The transparent cover 12 is rotatable under the drive of the drive device 4, such that the transparent cover 12 is moved relative to the wiping member 3 to be wiped and cleaned, so as to ensure its own cleanness. Since the movement of the transparent cover 12 does not affect the image acquisition of the camera 2, and the position of the wiping member 3 relative to the camera 2 is fixed, the arrangement of the wiping member 3 will not affect the image acquisition of the camera 2.

For the imaging device 100 according to embodiments of the present disclosure, the imaging device 100 keeps the camera 2 immobile relative to the wiping member 3, and rotates the transparent cover 12 by itself, so as to enable the wiping member 3 to clean the transparent cover 12 without affecting the normal image information acquisition of the camera 2.

As shown in FIGS. 1-3, the casing body 11 includes an upper casing 111 and a lower casing 112 that are spaced apart from each other in an up-and-down direction, and the transparent cover 12 is disposed between the upper casing 111 and the lower casing 112. The transparent cover 12 has an upper end rotatably fitted with an inner peripheral surface of the upper casing 111 and a lower end rotatably fitted with an inner peripheral surface of the lower casing 112. Thus, the rotation of the transparent cover 12 relative to the casing body 11 is achieved.

In some embodiments of the present disclosure, an outer peripheral surface of the upper casing 111 and an outer peripheral surface of the lower casing 112 protrude beyond an outer peripheral surface of the transparent cover 12 to reserve an installation space for the wiping member 3, in which the wiping member 3 is connected between the upper casing 111 and the casing body 113, and the three forming a whole are relatively stationary. Since the transparent cover 12 is moved relative to the casing body 11, the transparent cover 12 is also moved relative to the wiping member 3, and the wiping member 3 can wipe and clean the transparent cover 12 effectively.

In the embodiment shown in FIGS. 1-3, the outer peripheral surface of the upper casing 111 is provided with an upper casing groove 1111 that runs through a peripheral wall of the upper casing 111 upwards and downwards, and the outer peripheral surface of the lower casing 112 is provided with a lower casing groove 1121 that runs through a peripheral wall of the lower casing 112 upwards. The upper casing groove 1111 is corresponding to the lower casing groove 1121 in the up-and-down direction, and the wiping member 3 has an upper end connected in the upper casing groove 1111 and a lower end connected in the lower casing groove 1121. Since the outer surface of the upper casing 111 and the outer surface of the lower casing 112 are outside the outer surface of the transparent cover 12, in order to enable the wiping member 3 to contact the outer surface of the transparent cover 12 to realize a wiping function, the upper casing 111 is provided with the upper casing groove 1111 recessed inwards, and the lower casing 112 is provided with the lower casing groove 1121 recessed inwards. During installation, the wiping member 3 can be inserted downwards from the upper casing groove 1111 and then inserted into the lower casing groove 1121, and it is ensured that a wiping surface of the wiping member 3 is in close fit with the transparent cover 12 to guarantee a wiping and cleaning effect; finally, the upper end of the wiping member 3 is fixed in the upper casing groove 1111 by using a screw, and the lower end of the wiping member 3 is fixed in the lower casing groove 1121 by using a screw, thereby completing the assembly.

Referring to FIG. 3, the wiping member includes a connecting rod portion 31 and a wiping portion 32. The connecting rod portion 31 is configured to be connected with the upper casing groove 1111 and the lower casing groove 1121 to ensure that the wiping member 3 is stationary relative to the casing body 11 and the camera 2 in the casing body 11. The wiping portion 32 is disposed to an inner surface of the connecting rod portion 31 and configured to wipe the transparent cover 12 so as to guarantee the cleanness of the transparent cover 12.

As shown in FIG. 1, the drive device 4 includes a drive motor. The drive motor may directly drive the transparent cover 12 to rotate so as to implement the wiping and cleaning of the transparent cover 12 by the wiping member 3.

In an embodiment, a rotational speed of the transparent cover 12 driven by the drive device 4 is in proportion to the amount of rain/snow. That is, the more the rain or snow is accumulated on the transparent cover 12, the faster the drive device 4 drives the transparent cover 12 to rotate. Thus, it can be ensured that the rain or snow on the transparent cover 12 is quickly and timely cleared away, thereby avoiding influence on the normal image information acquisition of the camera 2.

Figure 4:
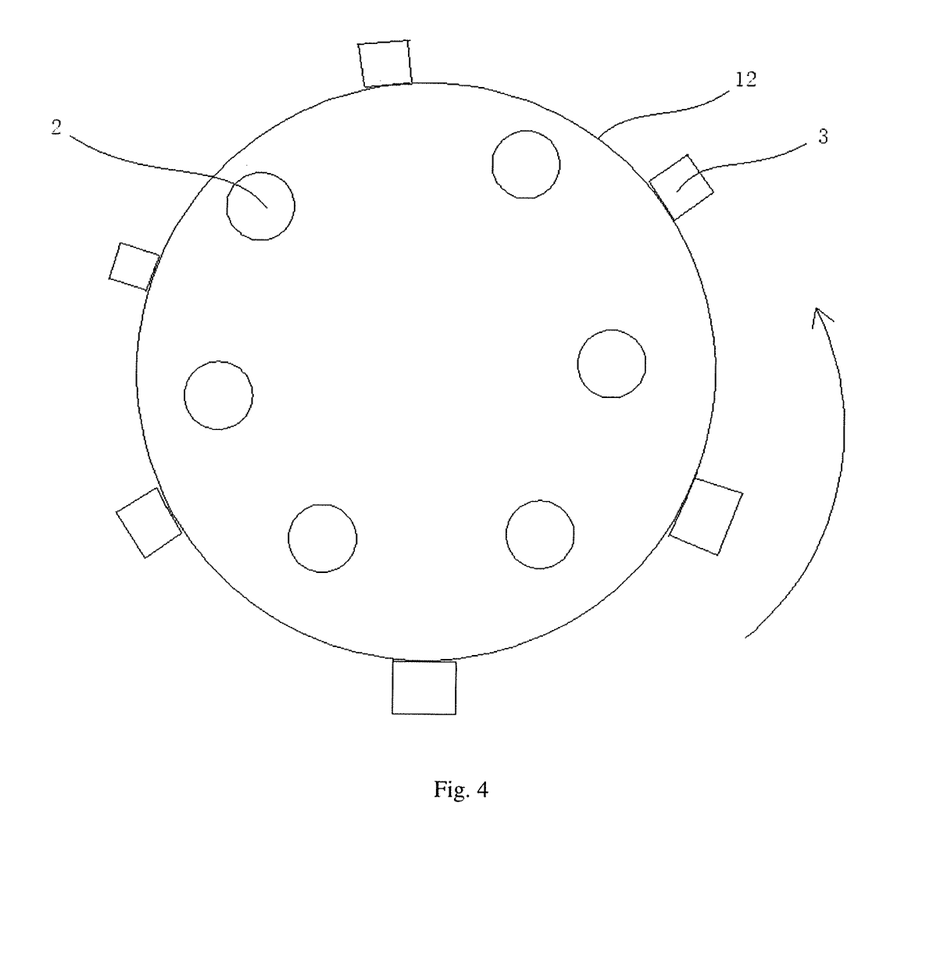
FIG. 4 is a schematic view illustrating a rotation direction of a transparent cover according to an embodiment of the present disclosure.
Figure 5:
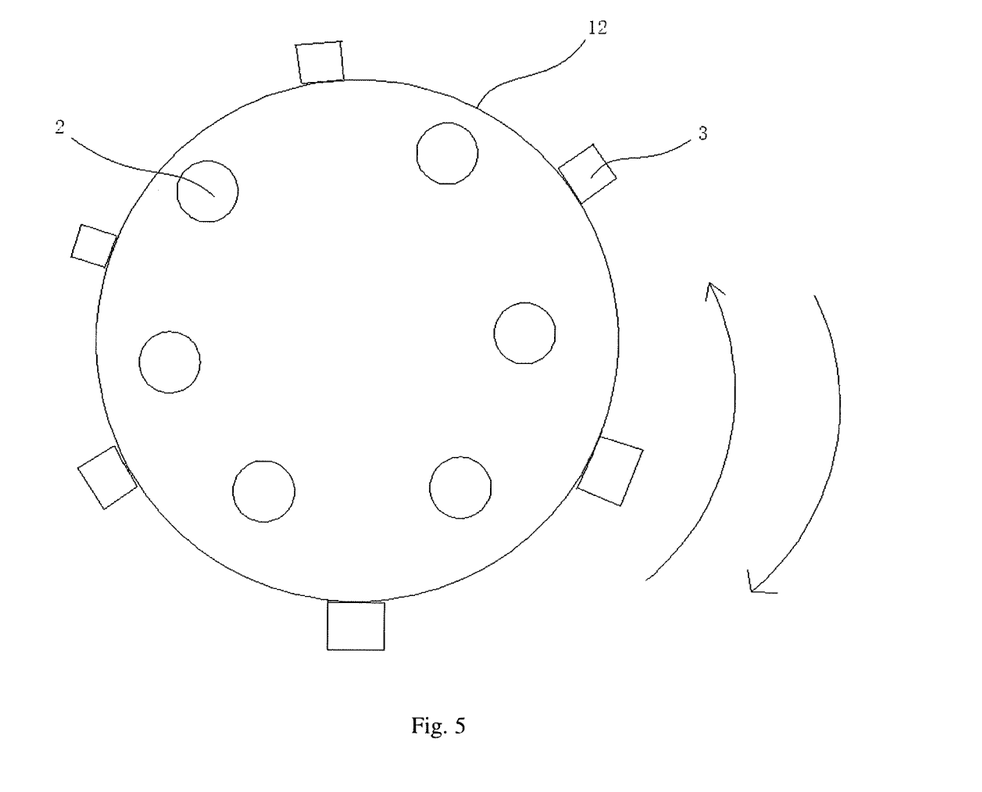
FIG. 5 is a schematic view illustrating a rotation direction of a transparent cover according to an embodiment of the present disclosure.

In some embodiments, the drive device 4 drives the transparent cover 12 to rotate in a single direction (as shown in FIG. 4), and the drive device 4 may drive the transparent cover 12 to rotate alternately in a forward direction and a reverse direction (as shown in FIG. 5). The rotation form of the transparent cover 12 driven by the drive device 4 can be determined according to specific situations, and for example, the rotation form of the transparent cover 12 can be adjusted in time at a position where the rain or snow is accumulated a lot. Thus, the practicability and operability is enhanced.

According to some embodiments of the present disclosure, the transparent cover 12 has an annular peripheral wall, and the annular peripheral wall is a part of the transparent cover 12 corresponding to the camera 2. The drive device 4 is used to drive the transparent cover 12 to rotate around a central axis of the annular peripheral wall. Thus, it can be ensured that the annular peripheral wall may be rotated more stably and a distance between the annular peripheral wall and each camera 2 will not vary during the rotation, and hence it can be ensured that the rotation of the transparent cover 12 will not affect the normal image information acquisition of the camera 2.

In some embodiments of the present disclosure, the transparent cover 12 has a circular top wall closing the annular peripheral wall and a circular bottom wall closing the annular peripheral wall. A drive shaft of the drive device 4 may be linked with the circular top wall and the circular bottom wall, to ensure that the drive device 4 can drive the annular peripheral wall to rotate and does not directly act on the annular peripheral wall, so as to avoid blocking a photographing path of the camera 2.

In some embodiments of the present disclosure, a rolling bearing is provided between the transparent cover 12 and the casing body 11 to enable the transparent cover 12 to be rotated relative to the casing body 11, and the arrangement of the rolling bearing may reduce friction between the transparent cover 12 and the casing body 11 effectively to make the rotation of the transparent cover 12 smoother, thereby avoiding noise generated due to the friction and improving the NVH performance of the whole vehicle.

A sealing ring is further provided between the transparent cover 12 and the casing body 11. Thus, it is possible to prevent external rainwater or dust from entering the casing 1 through between the transparent cover 12 and the casing body 11 and hence from damaging the camera 2 and the drive device 4, so as to ensure the normal operation of the imaging device 100.

In an embodiment, an inner peripheral surface of the transparent cover 12 is provided with a round of gear teeth, and the drive device 4 is configured as a drive motor whose motor shaft has a motor shaft gear. The motor shaft gear is meshed with the gear teeth directly or through a speed change mechanism for transmission. Driving rotation of the transparent cover 12 by the gear meshing transmission mode can ensure the stability of the rotational torque and power transmission, so as to ensure the cleaning effect on the transparent cover 12.

In an embodiment shown in FIGS. 1-5, a plurality of wiping members are provided and distributed along a circumferential direction to ensure the cleaning effect and cleaning efficiency of the transparent cover 12. A plurality of cameras 2 are also provided and distributed along the circumferential direction. For example, the cameras 2 are arranged in the transparent cover 12 in the form of a front side, a left side, a right side, and a rear side. The arrangement mode can be changed according to different setting requirements to ensure that all viewing angles around the vehicle can be covered, so as to more comprehensively collect information about the surrounding environment of the vehicle. The plurality of wiping members 3 and the plurality of cameras 2 are staggered in the circumferential direction. The number of the wiping members 3 may be set according to the number of the cameras 2. For example, four wiping members 3 may be provided and an included angle between two adjacent wiping members is 90°, that is, the wiping members are distributed equidistantly; or six wiping members 3 may be provided and the included angle between two adjacent wiping members is 60°, that is, the wiping members are distributed equidistantly. However, the present disclosure is not limited thereto. The wiping members 3 may not distributed equidistantly, as long as the wiping members and the cameras 2 are staggered.

Since the wiping member 3 and the camera 2 are relatively stationary, the two are arranged in a staggered manner to prevent the wiping member 3 from obscuring the photographing path of the camera 2, so as to ensure the accuracy of the image information acquisition of the camera 2.

A vehicle according to embodiments of another aspect of the present disclosure includes the imaging device 100 described in the above embodiments. Other configurations of the vehicle, such as transmissions, braking systems, steering systems or the like belong to the prior art and are well known to those skilled in the art, and hence will not be elaborated herein.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples.

Although embodiments of the present disclosure have been shown and described, it would be appreciated by those skilled in the art that the above embodiments are explanatory and cannot be construed to limit the present disclosure; changes, modifications, alternatives, and variations can be made in the above embodiments within the scope of the present disclosure.

What is claimed is:

1. An imaging device for a vehicle, comprising:
   a casing comprising a casing body and a transparent cover provided to the casing body, the transparent cover being rotatable relative to the casing body;
   a camera provided in the casing and configured to obtain image information outside the transparent cover through the transparent cover;
   a wiping member provided to the casing and being stationary relative to the camera; and
   a drive device connected with the transparent cover and configured to drive the transparent cover to rotate so as to enable the wiping member to wipe an outer surface of the transparent cover,
   wherein the casing body comprises an upper casing and a lower casing that are spaced apart from each other and not in contact with each other in an up-and-down direction, and the transparent cover is disposed between the upper casing and the lower casing, and
   wherein the wiping member fixedly connects the upper casing and the lower casing.

2. The imaging device according to claim 1, wherein the transparent cover has an upper end rotatably fitted with an inner peripheral surface of the upper casing and a lower end rotatably fitted with an inner peripheral surface of the lower casing, and an outer peripheral surface of the upper casing and an outer peripheral surface of the lower casing protrude beyond an outer peripheral surface of the transparent cover.

3. The imaging device according to claim 1, wherein the outer peripheral surface of the upper casing is provided with an upper casing groove running through a peripheral wall of the upper casing upwards and downwards, and the outer peripheral surface of the lower casing is provided with a lower casing groove running through a peripheral wall of the lower casing upwards; the upper casing groove is corresponding to the lower casing groove in the up-and-down direction; and the wiping member has an upper end connected in the upper casing groove and a lower end connected in the lower casing groove.

4. The imaging device according to claim 3, wherein the wiping member comprises a connecting rod portion and a wiping portion; the connecting rod portion is configured to be connected with the upper casing groove and the lower casing groove; and the wiping portion is disposed to an inner surface of the connecting rod portion and configured to wipe the transparent cover.

5. The imaging device according to claim 1, wherein the drive device comprises a drive motor.

6. The imaging device according to claim 1, wherein a rotational speed of the transparent cover driven by the drive device is in proportion to the amount of rain/snow.

7. The imaging device according to claim 1, wherein the drive device drives the transparent cover to rotate in a single direction.

8. The imaging device according to claim 1, wherein the drive device drives the transparent cover to rotate alternately in a forward direction and a reverse direction.

9. The imaging device according to claim 1, wherein the transparent cover has an annular peripheral wall, and the drive device is configured to drive the transparent cover to rotate around a central axis of the annular peripheral wall.

10. The imaging device according to claim 8, wherein the transparent cover has a circular top wall closing the annular peripheral wall and a circular bottom wall closing the annular peripheral wall.

11. The imaging device according to claim 10, wherein a drive shaft of the drive device is linked with the circular top wall and the circular peripheral wall.

12. The imaging device according to claim 8, wherein the transparent cover and the casing body are provided with a rolling bearing therebetween.

13. The imaging device according to claim 12, wherein the transparent cover and the casing body are further provided with a sealing ring therebetween.

14. The imaging device according to claim 8, wherein an inner peripheral surface of the transparent cover is provided with a round of gear teeth, the drive device is configured as a drive motor whose motor shaft has a motor shaft gear, and the motor shaft gear is meshed with the gear teeth directly or through a speed change mechanism for transmission.

15. The imaging device according to claim 1, wherein a plurality of wiping members are provided and distributed along a circumferential direction, a plurality of cameras are provided and distributed along the circumferential direction, and the plurality of wiping members and the plurality of cameras are staggered in the circumferential direction.

16. A vehicle, comprising:
an imaging device comprising:
a casing comprising a casing body and a transparent cover provided to the casing body, the transparent cover being rotatable relative to the casing body,
a camera provided in the casing and configured to obtain image information outside the transparent cover through the transparent cover,
a wiping member provided to the casing and being stationary relative to the camera, and
a drive device connected with the transparent cover and configured to drive the transparent cover to rotate so as to enable the wiping member to wipe an outer surface of the transparent cover; and
a roof, the imaging device being disposed on the roof of the vehicle,
wherein the casing body comprises an upper casing and a lower casing that are spaced apart from each other and not in contact with each other in an up-and-down direction, and the transparent cover is disposed between the upper casing and the lower casing, and
wherein the wiping member fixedly connects the upper casing and the lower casing.

17. The vehicle according to claim 16, wherein the transparent cover has an upper end rotatably fitted with an inner peripheral surface of the upper casing and a lower end rotatably fitted with an inner peripheral surface of the lower casing, and an outer peripheral surface of the upper casing and an outer peripheral surface of the lower casing protrude beyond an outer peripheral surface of the transparent cover.

18. An imaging device for a vehicle, comprising:
a casing comprising a casing body and a transparent cover provided to the casing body, the transparent cover being rotatable relative to the casing body;
a camera provided in the casing and configured to obtain image information outside the transparent cover through the transparent cover;
a wiping member provided to the casing and being stationary relative to the camera; and
a drive device connected with the transparent cover and configured to drive the transparent cover to rotate so as to enable the wiping member to wipe an outer surface of the transparent cover,
wherein the casing body comprises an upper casing and a lower casing that are spaced apart from each other and not in contact with each other in an up-and-down direction, and the transparent cover is disposed between the upper casing and the lower casing; the wiping member connects the upper casing and the lower casing, and
wherein the wiping member fixedly connects the upper casing and the lower casing.

19. The imaging device according to claim 1, wherein the transparent cover is exposed between the upper casing and the lower casing throughout 360° of a periphery of the imaging device.

* * * * *